United States Patent Office 3,082,151
Patented Mar. 19, 1963

3,082,151
AGENT FOR COMBATING LIVER FLUKES
Werner Meiser, Wuppertal-Vohwinkel, and Manfred Federmann, Wuppertal-Elberfeld, Germany, assignors to Farbenfabriken Bayer Aktiengesellschaft, Leverkusen, Germany, a corporation of Germany
No Drawing. Filed June 29, 1961, Ser. No. 120,481
Claims priority, application Germany July 22, 1960
3 Claims. (Cl. 167—53)

The present invention relates to a new agent for combating liver-flukes.

In veterinary medicine, the infestation of cattle with liver flukes (*Fasciola hetpatica*) causes considerable damage to national economy as can be seen from statistics. Thus, for example, liver worth millions has to be discarded ever year owing to infestation with flukes. The loss through decrease in weight, decrease in milk production, premature sterility and slaughtering can only be estimated, but is a multiple of the abovementioned amount, all the more since a loss of weight of 30–40% occurs already in young cattle due to infestation by liverflukes.

Hitherto, the therapy for this disease has been based on the use of hexachlorethane and carbon tetrachloride. The disadvantages of these agents consist in their high toxicity, the small therapeutical result, the diet prescriptions before and after treatment and the unsuitability of milk and meat for consumption shortly after treatment.

It is therefore an object of the present invention to provide an improved agent for combating this disease, which is highly effective, practically nontoxic and does not require additional precautional measures, such as dieting. Further objects will become apparent as the following specification proceeds. We have found that the 2,2'-dihydroxy-3,3'-dinitro-5,5'-dichloro diphenyl of the formula

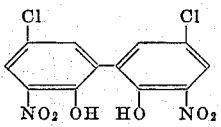

its salts and functional derivatives have an outstanding action on liver flukes.

The action is very specific. Thus, for example, the corresponding tetranitro compound is completely inefficient.

The compound used according to the invention is known in the literature in the Journal of the Chemical Society, vol. 101, p. 1973 (1912). The formula recited therein cannot be assented to, since it has been demonstrated that the actual formula is that recited above, i.e. 2,2'-dihydroxy-3,3'-dinitro-5,5'-dichlorodiphenyl. It can be produced by nitration of dichloro-2,2'-dihydroxy-diphenyl.

For the treatment of sheep and cattle, for example, a single dose of 2–5 mg./kg. is sufficient in order to achieve a complete cure. No diet prescriptions are necessary and there are no intolerance phenomena. Thus, for example, in the treatment of 272 cattle (127 cows and 145 heifers and young cattle), among them 23 highly pregnant animals, no intoxication phenomena occurred and the milk production was not reduced.

The compound can be administered per os or by injection. Wettable powders with a content of 30–88% which are stirred with water to form a suspension and administered per os with a Suko syringe, have proved very satisfactory. The preparation can also be admixed to the fodder. Aqueous suspensions prepared for example with the air of an emulsifier such as N-dimethylacetamide, dimethylformamide, N-methyl-pyrrolidone etc., with or without wetting agents, can be used for injection.

The functional derivatives of this compound such as acyl derivatives and the salts of the compound with inorganic or organic bases have the same effect as the parent preparation.

The action was tested by the secretion of eggs in samples of excrement, and that in each case 2 weeks prior to treatment with 8 excrement samples of naturally infested animals, and 4–6 weeks after treatment with 10 excrement samples. In each case the excrements were taken rectally in the morning after feeding. Furthermore the effect was checked by results after slaughtering.

As test method, a combined method was applied. 5 g. of excrement were placed with water in a sedimenting glass. After settling for 30 minutes, 2 cc. of sediment were withdrawn and mixed in a small centrifugal tube with water glass. After centrifuging for 3 minutes, 5 drops were withdrawn from the surface with a loop and the liver fluke eggs were counted. The animal was only accepted for test purposes if more than 10 eggs could be detected.

The following examples are given for the purpose of illustrating the invention.

EXAMPLE 1

2,2'-Dihydroxy-3,3'-Dinitro-5,5'-Dichloro-Diphenyl as Active Substance

[Test animal: sheep. Results: in table]

| Subdivision of number of animals according to degree of egg secretion before treatment | | Formulation | Dosage and administration | Tolerance | Subdivision of number of animals according to degree of egg secretion 6 weeks after treatment | | | Subdivision of number of animals acc. to findings after slaughter | |
|---|---|---|---|---|---|---|---|---|---|
| Number of animals | Average number of eggs in 5 g. of excrement/animal | | | | | 1-10 | 10 | No liver flukes detected | Liver flukes detected |
| 11 | 10-30 | 30% wett. powder | 2 mg./kg. orally | good | 9 | 2 | | 8 | 3 |
| 11 | 30-60 | do | do | do | 8 | 2 | 1 | 7 | 4 |
| 4 | >60 | do | do | do | 3 | 1 | | 3 | 1 |
| 8 | 10-30 | 30 and 50% wett. powder | 3 mg./kg. orally | do | 8 | | | 9 | |
| 9 | 30-60 | do | do | do | 9 | | | 9 | |
| 2 | >60 | do | do | do | 2 | | | 2 | |
| 5 | 10-30 | 9% solution [1] and 9% suspension.[2] | 3 mg./kg. i.m. | do | 5 | | | 5 | |
| 10 | 30-60 | do | do | do | 10 | | | 9 | 1 |

[1] The 9% solution was prepared from 9% of active substance, 10% of Tween 80 and 81% of N-methylpyrrolidone or N-dimethyl-acetamide.
[2] The 9% suspension was prepared from 9% of active substance, 30% of Tween and 81% of water.

EXAMPLE 2

2,2' - diacetoxy - 3,3' - dinitro - 5,5' - dichloro - diphenyl of M.P. 113° C., prepared from 2,2'-dihydroxy-3,3'-dinitro-5,5'-dichloro-diphenyl with acetic acid anhydride and the catalytic amount of concentrated sulphuric acid, was administered to 50 sheep in a single dose of 30 mg./kg. in each base by means of a peroral drench prepared from a 30% wettable powder. The average egg secretion was 39 14 days prior to treatment and zero throughout 4 weeks after treatment.

EXAMPLE 3

The zinc salt of 2,2'-dihydroxy-3,3'-dinitro-5,5'-dichloro diphenyl, prepared from a solution of 2,2'-dihydroxy-3,3'-dinitro-5,5'-dichloro-diphenyl in the calculated amount of sodium hydroxide solution by precipitation with zinc chloride, was administered to 5 sheep in a single dose of 6/mg./kg. in the form of a peroral drench. The average egg secretion which 14 days before treatment amounted to 25 was zero throughout 4 weeks after treatment.

We claim:

1. A composition for combating liver flukes consisting of an aqueous suspension of 2,2'-dihydroxy-3,3'-dinitro-5,5'-dichloro diphenyl and an emulsifier.

2. A composition for combating liver flukes consisting of a wettable powder containing of from about 30 to 88 percent of 2,2'-dihydroxy-3,3'-dinitro-5,5'-dichloro-diphenyl.

3. A composition for combating liver flukes consisting of a solution of about 9 percent of 2,2'-dihydroxy-3,3'-dinitro-5,5'-dichloro-diphenyl and a solvent selected from the class consisting of N-dimethyl acetamide, dimethyl formamide and N-methyl pyrrolidone.

References Cited in the file of this patent

Chem. Abst., vol. 42, 1948, page 4574b.